W. S. WALTZ.
CHAIN ATTACHING AND ADJUSTING DEVICE.
APPLICATION FILED NOV. 24, 1916.

1,243,469.

Patented Oct. 16, 1917.

W. S. Waltz, Inventor

UNITED STATES PATENT OFFICE.

WINFIELD S. WALTZ, OF MEDINA, OHIO, ASSIGNOR OF ONE-HALF TO ORLAN F. BAUGHMAN, OF CLEVELAND, OHIO.

CHAIN ATTACHING AND ADJUSTING DEVICE.

1,243,469. Specification of Letters Patent. Patented Oct. 16, 1917.

Application filed November 24, 1916. Serial No. 133,107.

*To all whom it may concern:*

Be it known that I, WINFIELD S. WALTZ, a citizen of the United States, residing at Medina, in the county of Medina and State of Ohio, have invented certain new and useful Improvements in Chain Attaching and Adjusting Devices, of which the following is a specification.

My invention relates to improvements in grip tread tighteners for traction wheels, and more particularly to that class or type commonly known as "emergency grips," the primary object of my invention being to provide a generally improved grip tread tightener of this class which may be readily and quickly attached to or detached from the tire and felly portions of an ordinary traction wheel.

A further object of the invention is the provision of an improved attaching and adjusting device for such grips which will enable the latter to be readily and quickly attached to traction wheels having wheel fellies and tires of various forms and dimensions and which when initially adjusted or attached may be readily readjusted to take up any slack in the chain grip resulting from use or otherwise.

A still further object is the provision of an improved tire grip member adapted to give great tractive power as well as one having removable traction studs whereby when the latter become worn they may be removed and be readily replaced with new ones of any suitable and convenient form.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
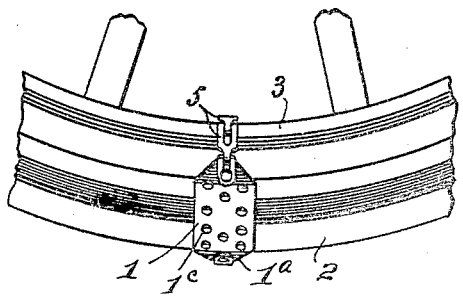

Referring to the drawings, forming a part of this specification, Figure 1, is a view of a grip tread applied to a wheel section and preparatory to being attached and adjusted through the improved attaching and adjusting device.

Figure 2:
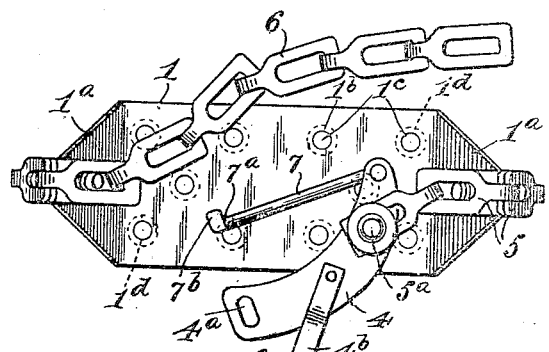

Fig. 2, a plan view of the same, the parts being shown in their open position preparatory to attachment.

Figure 3:
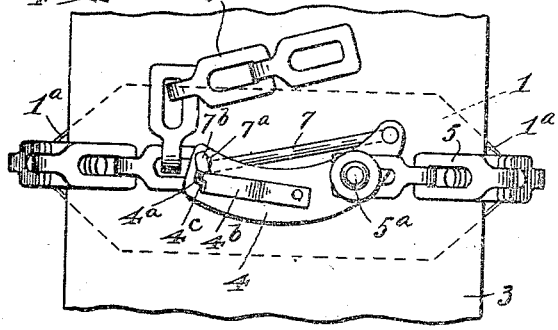

Fig. 3, a plan view of the same, the parts being shown in their normal or attached and interlocking positions on the wheel felly.

Figure 4:
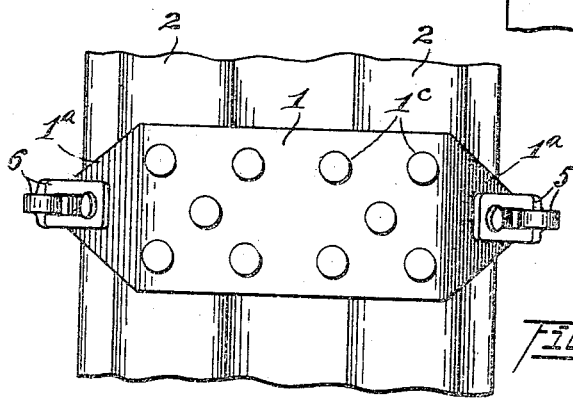

Fig. 4, a plan view of the tread portion of and grip tread member applied to a tire of the "dual tread" type.

Figure 5:
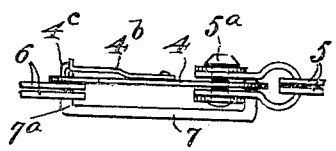

Fig. 5, a detailed side or edge view of the improved lever and chain engaging and contracting link member in engaged or interlocking positions.

Similar numerals of reference designate like parts throughout all the figures of the drawings.

The tire grip comprises a tire grip or cross member 1, adapted to extend across and about the periphery of a wheel tire 2, and to be attached and adjustably connected to the wheel felly 3, by means of an improved attaching and adjusting device to be hereinafter described.

The tire grip or cross member 1, may be of any suitable and convenient form to conform to the contour of the particular tire to which it is to be attached and is preferably provided with inwardly extending ends 1ª, to which the attaching and adjusting members hereinafter described may be attached. As a means of providing an improved traction surface for the grip or cross member 1, the latter is preferably provided with a plurality of openings 1ᵇ, adapted to removably receive and contain a plurality of traction studs 1ᶜ, the latter being provided with shouldered portions 1ᵈ, to rest and abut against the outside of the grip plate 1, and, if desired, the shank portions of the studs may be riveted in the openings 1ᵇ, or otherwise suitably secured therein so that the studs 1ᶜ, may be readily replaced when worn or mutilated.

As a means of quickly attaching and detaching the improved tire grip or cross member, and particularly as a means of adjusting and conforming the device as a whole to wheel tires and fellies with varying forms and dimensions, one end of the tire grip member 1, is provided with a lever member 4, flexibly and pivotally connected thereto by means of chain link members 5, one of said link members 5, being connected to the lever member 4, by means of a pivot bolt 5ª.

As a means of detachably and adjustably connecting the lever member 4, to the opposite end of the tire grip 1, through the medium of a felly engaging chain or cable member 6, and particularly as a means of securely contracting and clamping the parts in attached position, one end of the lever 4, is provided with an improved chain engaging and contracting link member 7, the latter being pivotally connected to the lever 4, near its pivoted portion and being provided at its free end with a hook portion 7ª adapted to take into and engage with one of the links in the chain 6, and after the free end of the lever 4, has been moved to its closed or chain contracted position said hook 7ª, is adapted to be passed into and interlock with an opening 4ª, in the free end of the lever, the outer end of the hook 7ª, being preferably provided with a bent over or flanged portion 7ᵇ, to prevent the opening 4ª, of the free end of the lever from becoming accidentally detached or disengaged. In this connection it will be observed upon reference to Fig. 3, of the drawings that the relative position and tension of the parts to the pivoted and free or interlocked ends will be such as to normally hold the hook 7ª, in interlocked engagement with the side of the opening 4ª, but as a precautionary measure the link member 4, may be provided with a spring arm 4ᵇ, provided with a lug or finger 4ᶜ, adapted to fit in the opening 4ª, and between one side of the latter and the hook 7ª, to prevent any possibility of the latter becoming disengaged in the case of the loosening of the parts and the failure of the tension thereon to hold the same in interlocked relation as hereinbefore explained.

From the foregoing description taken in connection with the accompanying drawings, the operation and advantages of my invention will be readily understood.

Having thus described one of the embodiments of my invention what I claim and desire to secure by Letters Patent, is,—

1. A chain connecting and adjusting device, comprising a chain member, a curved lever member pivotally connected to the end of said chain member, a link pivotally connected to the pivoted portion of said lever member and provided at its free end with an upwardly extending flanged hook adapted to extend through a link in the opposite portion of said chain member and to interlock within said opening when the parts are drawn up.

2. In a chain connecting and adjusting device, a chain member, a lever member flexibly attached to one end thereof and provided at its free end with a hook receiving opening, and a link member connected to said lever member near the pivoted portion thereof and provided at its free end with a hook extending through a link in said chain member and said hook receiving opening in free end of said member.

3. In a chain connecting and adjusting device, the combination with a chain member and a curved lever member flexibly attached thereto, a link member connected to one end of said lever member and adapted to extend across the curved side of the latter and provided with a link engaging hook engaged by the free end of said lever member, and latching means carried by said lever member for preventing the disengagement of said link member when the parts are in their connecting position.

4. A chain connecting and adjusting device, comprising a lever member provided with a flexibly connected chain member and having a hook receiving opening at its opposite end, and a link member pivotally connected to one end of said lever member and provided at its opposite end with a hook extending through a link in said chain member and said opening of said lever when the parts are connected.

5. In a chain connecting and adjusting device, the combination with a chain member, of a curved member attached to one end thereof and provided at its opposite end with a hook receiving opening, and a link member connected to said lever member near the pivoted portion thereof and adapted to extend along the curved side of said lever and having a hook extending through a link in said chain member and said hook receiving opening of said lever member.

In testimony whereof I have affixed my signature in the presence of two witnesses.

WINFIELD S. WALTZ.

Witnesses:
O. C. BILLMAN,
T. T. TURNER.

Copies of this patent may be obtained for five cents each, by addressing the "Commissioner of Patents, Washington, D. C."